United States Patent
Letoumelin et al.

(10) Patent No.: US 11,001,193 B2
(45) Date of Patent: May 11, 2021

(54) PIVOTABLE LIGHTING MODULE FOR VEHICLE LAMP

(71) Applicant: Valeo Vision, Bobigny (FR)

(72) Inventors: Remi Letoumelin, Bobigny (FR); Pascal Garin, Bobigny (FR); Stephane Andre, Bobigny (FR); Thibaut Menn, Bobigny (FR)

(73) Assignee: Valeo Vision, Bobigny (FR)

( * ) Notice: Subject to any disclaimer, the term of this patent is extended or adjusted under 35 U.S.C. 154(b) by 160 days.

(21) Appl. No.: 16/054,459

(22) Filed: Aug. 3, 2018

(65) Prior Publication Data
US 2019/0039504 A1   Feb. 7, 2019

(30) Foreign Application Priority Data

Aug. 4, 2017 (FR) ..................................... 17 57523

(51) Int. Cl.
*B60Q 1/068* (2006.01)
*F21S 41/143* (2018.01)
(Continued)

(52) U.S. Cl.
CPC ............ *B60Q 1/068* (2013.01); *F21S 41/143* (2018.01); *F21S 41/295* (2018.01); *F21S 41/657* (2018.01); *F21S 45/47* (2018.01); *F21V 17/12* (2013.01); *F21V 29/745* (2015.01); *F21V 29/75* (2015.01); *F21V 29/763* (2015.01); *F21V 29/773* (2015.01)

(58) Field of Classification Search
CPC ...... F21V 29/75; F21V 29/763; F21V 29/773; F21V 29/745
See application file for complete search history.

(56) References Cited

U.S. PATENT DOCUMENTS 5,758,955 A * 6/1998 Belliveau .................. F21V 9/04
362/293
D605,789 S * 12/2009 Ko ................................ D26/28
(Continued)

FOREIGN PATENT DOCUMENTS

| EP | 2 218 964 A2 | 8/2010 |
|---|---|---|
| WO | WO 2008/019504 A1 | 2/2008 |
| WO | WO 2014/124477 A1 | 8/2014 |

OTHER PUBLICATIONS

French Preliminary Search Report dated Jan. 16, 2018 in French Application 17 57523, filed on Aug. 4, 2017 (with English Translation of Categories of cited documents).

*Primary Examiner* — Diane I Lee
*Assistant Examiner* — Zachary J Snyder
(74) *Attorney, Agent, or Firm* — Oblon, McClelland, Maier & Neustadt, L.L.P.

(57) ABSTRACT

A lighting module includes at least one heatsink configured to dissipate heat generated by a light source, the heatsink including at least a base and a dissipation member, the dissipation member including a series of fins projecting from the base, each fin being defined by a summit that defines the length of that fin, and by two end edges extending between the summit and the base. The lighting module is configured to pivot about two pivot axes, and the series of fins includes eccentric fins the length of which is less than the lengths of the fins at the centre of the dissipation member, at least one fin further having at least one bevel at the junction between the summit and an end edge.

18 Claims, 3 Drawing Sheets

(51) Int. Cl.

| | |
|---|---|
| *F21S 45/47* | (2018.01) |
| *F21S 41/657* | (2018.01) |
| *F21S 41/151* | (2018.01) |
| *F21S 41/19* | (2018.01) |
| *F21S 41/29* | (2018.01) |
| *F21V 29/74* | (2015.01) |
| *F21V 29/75* | (2015.01) |
| *F21V 29/76* | (2015.01) |
| *F21V 29/77* | (2015.01) |
| *F21S 41/147* | (2018.01) |
| *F21S 41/255* | (2018.01) |
| *F21V 17/12* | (2006.01) |

(56) References Cited

U.S. PATENT DOCUMENTS

| | | | |
|---|---|---|---|
| 7,753,556 B1* | 7/2010 | Zhang | F21V 31/005 362/249.02 |
| D766,473 S * | 9/2016 | Riedel | B60Q 1/072 D26/28 |
| 10,182,485 B2* | 1/2019 | Casper | F21V 15/012 |
| 2007/0076413 A1* | 4/2007 | Mingozzi | F21K 9/233 362/249.01 |
| 2008/0068839 A1 | 3/2008 | Matheson | |
| 2008/0112179 A1* | 5/2008 | Tatara | B60Q 1/072 362/515 |
| 2009/0213588 A1 | 8/2009 | Manes | |
| 2010/0172132 A1* | 7/2010 | Ko | B60Q 1/0483 362/235 |
| 2010/0208483 A1 | 8/2010 | Hamashima | |
| 2010/0246172 A1* | 9/2010 | Liu | F21V 15/01 362/235 |
| 2010/0315812 A1* | 12/2010 | Liu | F21V 29/75 362/235 |
| 2013/0003378 A1* | 1/2013 | Dube | F21V 29/763 362/249.03 |
| 2013/0329405 A1 | 12/2013 | Chow | |
| 2015/0377440 A1 | 12/2015 | Reitegger et al. | |
| 2018/0209636 A1* | 7/2018 | Sohn | F21V 29/75 |

* cited by examiner

PIVOTABLE LIGHTING MODULE FOR VEHICLE LAMP

The invention relates to the field of lighting and/or signalling devices for motor vehicles. It concerns more particularly a lighting module intended to be mounted in a motor vehicle lamp, the optical module being pivotable relative to the lamp.

Motor lamps usually consist of a housing that is closed by a transparent wall through which pass or passes one or more light beams emitted by one or more lighting modules housed in this lamp housing. A lighting module primarily comprises a light source and an optical system adapted to modify at least one parameter of the light generated by the light source to emit this light beam or these light beams.

Technical advances are tending to encourage the use of light sources consisting of at least one light-emitting diode or LED, because of their low energy consumption, their small overall size and the quality of the lighting obtained.

However, light-emitting diodes have the disadvantage of producing heat when lit that proves compromising for their operation. Actually, the more the temperature of a light-emitting diode rises, the more its luminous flux decreases. If the lighting module is designed to generate a beam necessitating a high luminous intensity, such as for high beams, low beams or fog beams, the number of light-emitting diodes and/or the power necessary for their operation is or are high. Because of the large rise in temperature of the lighting module during its use, it is necessary to reduce its temperature to prevent any damage inherent to excessive heat.

To provide effective cooling of the lighting module equipped with these light-emitting diodes, there is disposed in this module a heatsink including a base supporting the light-emitting diodes on a first face and a heat dissipating part provided on the face of the base opposite this first face. The heat dissipating part may notably be disposed toward the bottom of the housing of the lamp, i.e. at the end opposite the transparent wall closing the housing. The presence of the heat dissipating part, although it enables optimum evacuation of heat, has the disadvantage of increasing the overall volume of the lighting module and therefore making it more difficult to integrate into a lamp.

This integration problem is all the more real when one or more lighting modules must be mounted in the lamp to be mobile so as to be able to light dynamically different parts of the same scene. Naturally, the lamp must then provide a free space, between the pivotable lighting module and the walls delimiting the housing of the lamp, that is sufficiently large to allow the pivoting of the lighting module and its heat dissipating part.

The invention falls within this context and proposes a lighting module comprising a heat dissipating part adapted significantly to reduce the volume occupied by the lighting module as a whole in order to facilitate its pivoting in a small space in a motor vehicle lamp.

To this end, the invention proposes a motor vehicle lighting module for generating at least one light beam along an optical axis, the lighting module comprising at least one light source and at least one heatsink configured to dissipate heat generated by the light source, the heatsink comprising at least a base adapted to capture the heat generated by the light source and a dissipation member adapted to dissipate the heat captured by the base externally of the lighting module, the dissipation member comprising a series of fins projecting from the base, each fin being defined by a summit that extends at a distance from the base and that defines the length of that fin, and by two end edges extending between said summit and said base.

According to the invention the lighting module is configured to pivot about a first pivot axis and about a second pivot axis, and the series of fins is configured to include eccentric fins the length of which is less than the length of the fins at the centre of the dissipation member, at least one fin further having at least one bevel at the junction between the summit and an end edge.

The dissipation member therefore comprises fins, necessary for increasing the heat exchange area and correct dissipation of heat, the length of which decreases from the centre toward the periphery of the series of fins in such a manner as to reduce its overall size at the level of opposite edges of the base. By "length" is meant the direction in which the fins extend away from the base. For at least one fin, the height of a summit is less than the height of the fin at the level of the base of the heatsink. Here by "height" is meant the direction in which the summits of the fins extend, parallel to the first pivot axis. This embodiment advantageously enables reduction of the space necessary in a lamp to pivot the lighting module, and therefore greatly facilitates the integration of the lighting module into a lamp when the lighting module pivots in said lamp.

According to different variant embodiments, separately or in combination, it may be provided that:

the length of the fins decreases in the direction away from the centre of the series of fins.

the length of fins decreases in a constant manner in the direction away from the centre of the series of parallel fins.

the length of fins varies so that their summits are inscribed in a cylindrical shape. In other words, the lengths of the fins are such that the summits are disposed on or inside a circle the radius of which is substantially defined by the dimension between the summit of the central fin and a pivot axis, the fins being arranged inside this circle. In this context, the length of the fins may decrease in a constant manner in the direction away from the centre of the series of parallel fins, or the length variation may consist in a length reduction of variable pitch, notably to adapt to specific thermal constraints of a lighting module.

the cylindrical shape in which the summits are inscribed has an axis coinciding with the first pivot axis.

the summits extend parallel to the first pivot axis.

the lighting module is configured to pivot about a second pivot axis perpendicular to the first pivot axis.

for at least one fin, the height of the summit is between 10% and 80% inclusive, preferably between 30% and 60% inclusive, of the height of the fin at the level of the base of the heatsink.

a plurality of fins have a bevel at the junction between their summit and one of the end edges.

at least one fin has a bevel at each junction between its summit and its end edges.

an end edge of a fin having a bevel includes a straight part, adjacent to the base, and an inclined part that extends it and that forms a ramp, said inclined part having a longitudinal dimension at least equal to that of the straight part.

the dissipation member is fixed, for example glued, to the base or is made in one piece with this base.

the fins extend perpendicularly to a first plane in which the base mostly extends.

the base is inscribed in a plane perpendicular to the optical axis.

Of course, the various features, variants and embodiments referred to above may be associated with one another in various combinations provided that they are not incompatible or mutually exclusive.

The invention also relates to a motor vehicle lamp including a housing inside which at least one lighting module described above is mounted to be pivotable about two pivot axes.

The lighting module may notably pivot about a first pivot axis, and this first pivot axis may coincide with an axis of revolution of a cylinder in which are inscribed the summits of the series of fins.

The lighting module may pivot about a second pivot axis normal or substantially normal to the optical axis and to the first pivot axis of the lighting module. The bevelled edges of the fins are preferably configured to minimize the space necessary in the motor lamp to allow the pivoting of the lighting module about the second pivot axis.

Other features, details and advantages of the invention will emerge more clearly on reading the following description given by way of illustration with reference to the drawings in which.

It should first be noted that the figures show the invention in detail for execution of the invention, said figures being if necessary able to serve to better define the invention of course.

In the remainder of the description, the longitudinal, vertical and transverse directions are referred to the motor vehicle including a lamp in which a lighting module according to one aspect of the invention is integrated. A longitudinal direction L corresponds to a direction of forward movement of the vehicle and to the direction of the optical axis Ax along which the light rays generated by the lighting module 1 mostly extend when the lighting module is in a standard position in the front lamp. A transverse direction T corresponds to a direction perpendicular to this longitudinal direction that extends horizontally, and a vertical direction V corresponds to a direction perpendicular to the longitudinal and transverse directions that extends vertically. The front and rear, left and right, high and low orientations are respectively relative to each of the previously described longitudinal, vertical and transverse directions, and are to be considered relative to the observation station of the driver of a vehicle travelling forwards and with reference to the trihedron L, V, T shown in the figures.

FIGS. 1 to 5 show a lighting module 1, also known as an optical module, the function of which is to generate one or more light beams and to project them onto a road. A lighting module 1 of this kind is intended to be installed in a lamp 100, for example a front lamp, of a motor vehicle as shown in FIGS. 2 to 5. It will be noted that the lamp referred to here comprises overall a housing 102 closed at the front by a transparent outer lens 104, through which the light rays created by the lighting module according to the invention pass. The shape of the housing 102 has been represented diagrammatically here and it will be clear that the dimensions of this housing may be modified to receive one or more lighting modules according to the invention in the interior volume of the lamp, delimited by the housing 102 and the transparent outer lens 104.

A lighting module 1 according to one aspect of the invention forms a unitary subassembly, i.e. an object that is able to fulfil its lighting and/or signalling function with no input other than the necessary electrical energy.

The lighting module 1 according to the invention is adapted to form a light beam of a unique type, such as a low beam lamp or a high beam lamp. Alternatively, the lighting module 1 is very particularly adapted to create the low beam lamp beam and the high beam lamp beam. According to one embodiment, the lighting module 1 is adapted so that the high beam is the combination of the low beam lamp beam with a complementary beam that lights above the low beam lamp beam, the combination thus forming the high beam lamp beam. Depending on the load of the vehicle for example, it must be possible to modify the attitude by inclining the lamps or the lighting modules inside these lamps, more particularly by pivoting about a horizontal axis. Moreover, to obtain a DBL (Dynamic Bending Light) type function, the projection of the light beam in a direction parallel to the direction of forward movement of the vehicle must be modifiable in order to light the inside of turns when the vehicle turns for example, and to this end the lighting modules must be pivotable about a vertical axis.

Figure 2:
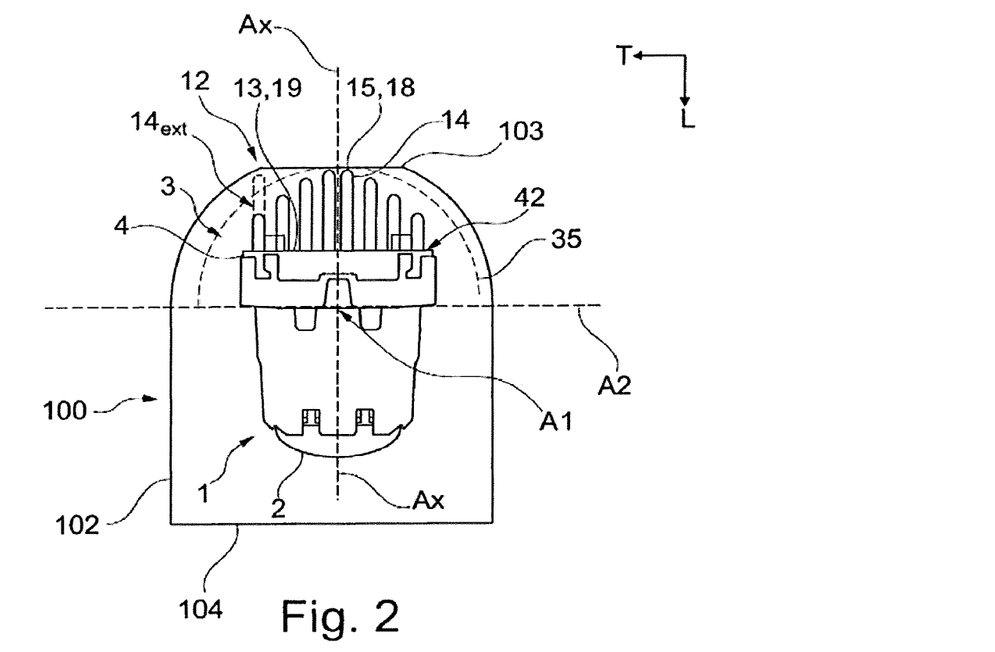
FIG. 2 is a view from above of the lighting module shown in FIG. 1, in which there has been shown a motor vehicle lamp case accommodating this lighting module, said lighting module being in a first standard projection position here.

In the lamp according to the invention, and more particularly a vehicle front lamp, the lighting module or modules 1 accommodated inside this lamp pivot, i.e. they are mounted on the housing of the lamp, or on a structural part fastened to this housing. The lighting module or modules 1 is or are configured to pivot in the lamp, at least between a standard position, as shown in FIGS. 2 and 4, in which the optical axis is oriented parallel to the longitudinal direction, in a horizontal plane, in order essentially to light the road scene upstream of the vehicle, and a dynamic position, after pivoting about a first pivot axis (FIG. 3) or about a second pivot axis (FIG. 5), in order to be able to light dynamically parts of a road scene insufficiently lit by the standard position of the lighting module or modules, by modifying using known means the height of the optical axis Ax and/or its lateral orientation.

According to the invention, and as described in more detail hereinafter, at least one lighting module includes cooling means configured to have an overall size constituting a compromise between the necessary cooling of the components of the module and the compactness of the housing of the lamp inside which the lighting module equipped with these cooling means must pivot.

Figure 1:
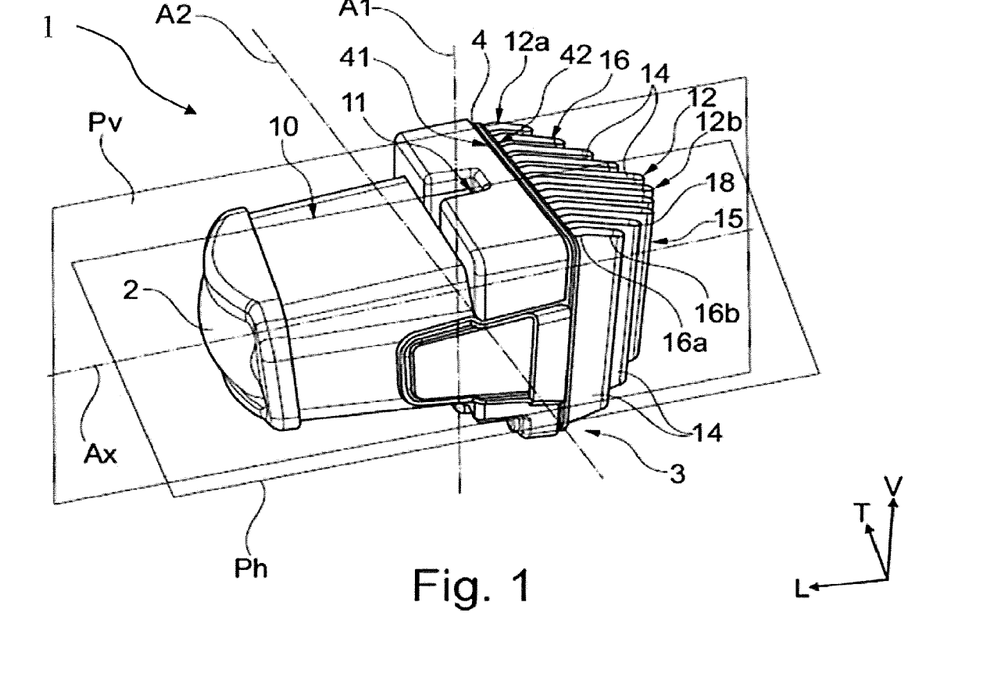
FIG. 1 is a perspective view of a lighting module according to one aspect of the invention, in which there have notably been shown a lens, a body and a heat dissipator member.

FIG. 1 shows in more detail a lighting module 1 according to the invention. The lighting module 1 comprises least one light source, not shown here configured to emit light rays toward the exit of the lighting module along the optical axis Ax, a projection lens 2 disposed at the exit of the lighting module 1 so as to have the light rays emitted by the light source pass through it, and a heatsink 3 configured to evacuate heat resulting from the operation of the light source to the rear of the module, i.e. at the end opposite the projection lens. The lighting module 1 includes a body 10 configured on the one hand to contain the light rays between the light source or sources and the projection lens 2 and on the other hand to form a mechanical support for each of the components and notably the projection lens and the heatsink. Moreover, the body 10 includes means 11 for receiving a frame, not shown here, enabling the rotation about two pivot axes A1 and A2.

The projection lens 2 participates in the formation of the required light beam, whether it be a low beam lamp type beam or a high beam lamp type beam. As has been explained, the projection lens 2 forms a first longitudinal end of the lighting module 1, opposite the heatsink 3.

The light source or sources can take the form of one or more light-emitting diodes, the operation of which may be disturbed by too high an ambient heat. It is necessary to find a compromise between the size of the heatsink 3, intended to drain the heat generated by the light source or sources and therefore to reduce the temperature thereof, and the overall size of this heatsink.

It should be noted that in the housing defined inside the lamp to receive the lighting module or modules, the heatsink 3, positioned on a rear part of the lighting module, faces a wall delimiting a back 103 of the lamp housing 102, opposite the transparent outer lens 104. The shape of this back wall 103 and the shape of the heatsink 3 must be such that the heatsink can follow the pivoting movement of the lighting module about the two pivot axes without striking the back wall 103 of the lamp housing 102.

The lighting module 1 may be associated with a fan, so as to force a circulation of air away from or toward the heatsink 3. A fan of this kind, not shown here, may be fastened to the housing of the lamp. Alternatively, the lighting module may carry the fan, completing the unitary subassembly referred to above. The fan is therefore attached to the lighting module and disposed under the heatsink.

The lighting module is configured to pivot in two directions, i.e. about two axes that here are perpendicular. A first pivot axis $A_1$ is a vertical axis, so that the lighting module is able to pivot to assume a plurality of positions around this vertical axis to light laterally to a greater or lesser degree, and a second pivot axis $A_2$ is a horizontal transverse axis, so that the lighting module is able to pivot to assume a plurality of positions around this second axis to light vertically to a greater or lesser degree. These two pivot axes may intersect at a central pivot point, without this being limiting on the invention.

Hereinafter, and as shown in FIG. 1, a vertical median lengthwise plane Pv of the lighting module is defined as a vertical plane containing the optical axis Ax and the first axis A1 for the transverse pivoting of the lighting module and a horizontal median lengthwise plane Ph of the lighting module is defined as a horizontal plane containing the optical axis Ax and the second axis A2 for the vertical pivoting of the lighting module.

There will now be described in more detail a form of lighting module equipped with a specific heatsink that makes it possible to limit the overall size of the module on pivoting about one or the other of its pivot axes, so that the shape of the back wall 103 of the lamp housing can be adjusted accordingly to limit the overall size of the lamp in the motor vehicle.

As can be seen in FIGS. 1 to 5, the heatsink 3 notably comprises a base 4 and a dissipation member 12. To be more precise, the base 4 has a first face 41, facing toward the body of the lighting module, and a second face 42 opposite the first face and from which the dissipation member 12 extends. Moreover, the base 4 serves as a mechanical support for the light source or sources and the elements controlling the light source or sources. It is clear that as a result the dissipation member 12 is adapted to dissipate heat captured by the base 4 when the light sources are operating, this heat being dissipated on the side of the back wall 103 of the lamp housing 102.

The dissipation member 12 extends longitudinally, i.e. perpendicularly to the base of the heatsink, between a first longitudinal end zone 12a fastened to this base 4 by gluing, welding or any other manufacturing process and a second longitudinal end zone 12b that remains free and faces the back wall 103. The clearance J left between this free second longitudinal end zone 12b and the back wall of the lamp housing allowing pivoting of the lighting module inside the lamp. The length of the dissipation member is defined along this longitudinal direction and projecting from the base.

As described in more detail hereinafter, the heatsink 3 includes a particular dissipation member 12 in that its free second longitudinal end zone 12b is truncated both on its lateral edges and on its vertical edges relative to the centre of the dissipation member, in order to facilitate the pivoting of the lighting module inside the lamp housing. In other words, the length of the dissipation member is reduced on its vertical edges and on its longitudinal edges relative to the length of the centre of the dissipation member.

The dissipation member 12 more particularly comprises a baseplate 13 pressed against the base 4 and a plurality of parallel fins 14 perpendicular to the baseplate 13 and to the second face 42 of the base 4. It will be clear that the base and the baseplate could be one and the same in the feasible embodiment, not shown here, in which the fins are produced in one piece with the base.

Each fin 14 has the shape of a plate including a summit 15 formed by the free edge extending parallel to and opposite the base 4, and including two end edges 16 extending between the summit and the base. The summit 15 corresponds to the second longitudinal end zone described above and the end edges 16 extend perpendicular to the base of the first longitudinal end zone 12a and the second longitudinal end zone 12b.

As explained above, the length of the fins of the dissipation member is defined as the longitudinal distance between the summit 15 of the fin and the base 4 common to these fins.

The separation between each fin 14 of the dissipation member 12, i.e. the transverse dimension between two successive fins of the series of fins, is between 4 mm and 8 mm inclusive for example. A separation of this kind may advantageously be between 6 mm and 8 mm inclusive, notably for a lighting module with no fan.

Described hereinafter is the particular shape of the fins of the dissipation member at the level of the summits and notably the specific truncation of these fins to allow the required compromise between heat dissipation and the mobility of the lighting module within a small overall size. In this context, it is possible, as shown, to have junction zones between the fins of the series. The fins 14 can therefore be joined two by two at their summits 15 by a connection 18 of rounded shape extending at a distance from the base 4.

As can more particularly be seen in FIGS. 2 to 5, the dissipation member 12 may therefore take the form of a corrugated part 33 that projects from the second face 42 of the base 4, being fastened to the latter, for example by a thermal glue. More particularly, the corrugated part 33 may be formed of at least one rolled sheet mounted against the second face 42 of the base. By way of nonlimiting example of a production process, this corrugated part 33 may be formed from a single sheet at least by a method of rolling and bending.

In this corrugated part formed by a single sheet, the fins are interconnected alternately by connections 18 of rounded shape at the level of their summits 15 and by plane junctions 19 at the level of the end of the fins opposite the connections 18 of rounded shape. In other words, a fin 14 is connected to a first adjacent fin, in a first transverse direction, by a connection 18 of rounded shape, at a distance from the base, and to a second adjacent fin, in the opposite transverse direction, by a plane junction 19 against the base. A plurality of junctions 19 form the baseplate 13 as described above.

Whether the fins are interconnected at the level of their summit or free opposite the base, the fins extend parallel to one another, and in a respective plane parallel to the vertical median lengthwise plane Pv of the lighting module. The summits 15 of each fin extend parallel to the base, and parallel to the first pivot axis $A_1$ of the lighting module.

It is to be noted that the length of the fins 14 decreases from the centre of the base 4 in the direction of its periphery, which is remarkable, with the result that the fins 14 situated on the outside of the series of parallel fins have a length less than that of the fins situated at the centre of said series. In other words, the fins disposed at the greatest distance from the vertical median lengthwise plane Pv are smaller than those disposed closest to this lengthwise plane, it being understood that a first fin is smaller than a second fin if the longitudinal dimension of this first fin, from its base to the summit, is smaller than that of the second fin.

Figure 3:
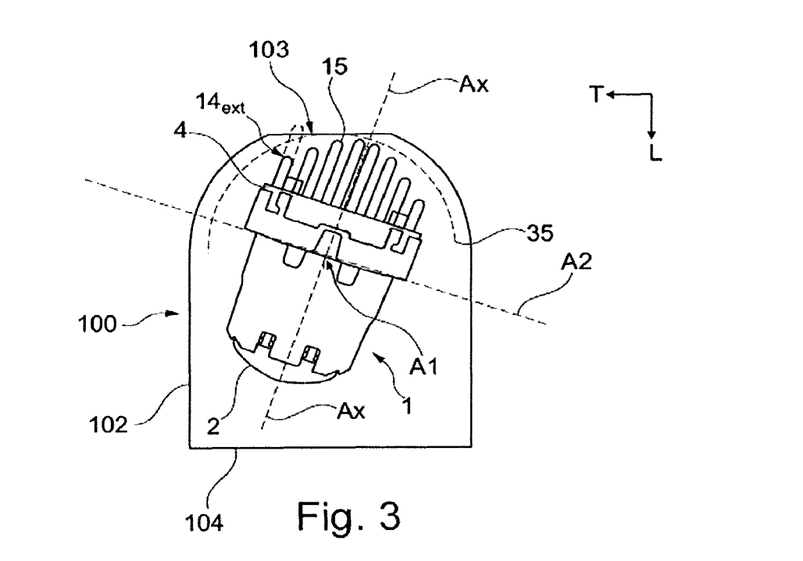
FIG. 3 is a view from above similar to that from FIG. 2, in which the lighting module is in a second projection position, pivoted in the lamp about a first pivot axis.
Figure 4:
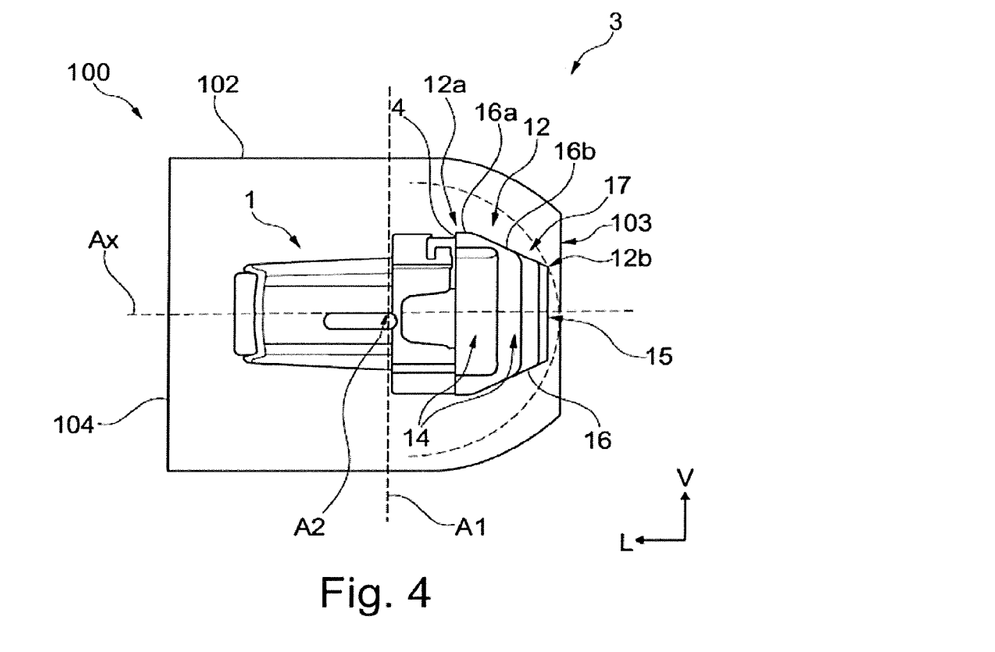
FIG. 4 is a side view of the lighting module shown in FIG. 1, in which there has been shown a motor vehicle lamp housing accommodating this lighting module, said lighting module being in a first standard projection position here.

As can be seen in FIGS. 2 and 3, the result of this is that the back wall 103 of the lamp housing may be arranged as close as possible to the fins 14 with the greatest dimensions, i.e. the fin or fins closest to the vertical median lengthwise plane Pv, since there is no risk of the outside fins striking this wall upon pivoting of the lighting module toward the exterior and notably on the passage from the standard position to an extreme pivoted position.

Accordingly, when the lighting module 1 is mounted in a housing 102 of a lamp 100 so as to be able to pivot about a first pivot axis A1, the progressive reduction of the lengths of the fins 14 advantageously allows rotation of the lighting module without the dissipation member 12 striking the back wall 103 of this lighting module 102. Because of this, the invention makes it possible to reduce significantly the dimensions required for the lamp housing 102 since according to what is shown, this housing can have a plane back wall 103, forming a flat that reduces the general overall size of the housing whilst allowing pivoting of the module that it contains.

In order to facilitate an understanding of the benefit of this kind of configuration of the fins, there has been shown in dashed line in these FIGS. 2 and 3, an exterior fin 14 ext of standard shape, i.e. with a longitudinal dimension equal to that of the central fins. It is clear that in the second position shown in FIG. 3, after pivoting, this kind of exterior fin 14 ext of standard shape would have come into contact with the back wall 103 of the lamp housing as sized here, and that it would therefore have been necessary to increase the overall size of this lamp housing to enable the total pivoting of the lighting module.

An optimum shape of the lamp housing can be obtained, for the freedom of transverse pivoting of the lighting module, by extending the longitudinal dimension feature of the fins as just described to all of the fins of the series. Each fin therefore has a length greater than the fin directly adjacent to it in the direction of the nearest end of the dissipation member and a length less than the fin that is directly adjacent to it in the direction of the centre of this dissipation member.

It is clear that the reduction of the length of the fins is then effected progressively from the interior toward the exterior of the dissipation member 12. In this context this reduction of the length of the fins could be effected in a constant manner, with a regular pitch from one fin to another, and symmetrically relative to the vertical lengthwise plane Pv.

In the example illustrated, the two fins disposed at the centre of the series, on respective opposite sides of the optical axis Ax, have the same length, the reduction of the length of the fins starting only from these two central fins. In a variant embodiment, none of the fins would have the same dimension or, to the contrary, a greater number of central fins, and notably three of them, would have the same length, the reduction of the length of the fins in the outward direction not affecting these three central fins.

As shown in FIGS. 2 and 3, the summits 15 of the fins 14 are then inscribed in a circular base cylindrical shape 35, so that the axis of revolution of this cylindrical shape 35 coincides with the first pivot axis $A_1$. In any pivoted position, the fins do not project beyond the theoretical envelope of this cylindrical shape, and the lamp housing 102 can then be constructed as close as possible to this theoretical envelope.

According to the invention, the dissipation member is further configured to optimize the overall size of the lamp housing whilst allowing the rotation of the lighting module about the second pivot axis A2. To this end, the fins 14 are truncated at each of their end edges 16. More particularly, each fin 14 has at least one bevel 17 at the level of the junction between the summit 15 and an end edge 16.

As a result, referred to the vertical orientation of the lighting module and its dissipation member, the parts of a fin at the greatest distance from the horizontal median lengthwise plane Ph have a length less than the central part of that fin, centred on this horizontal median lengthwise plane.

Figure 5:
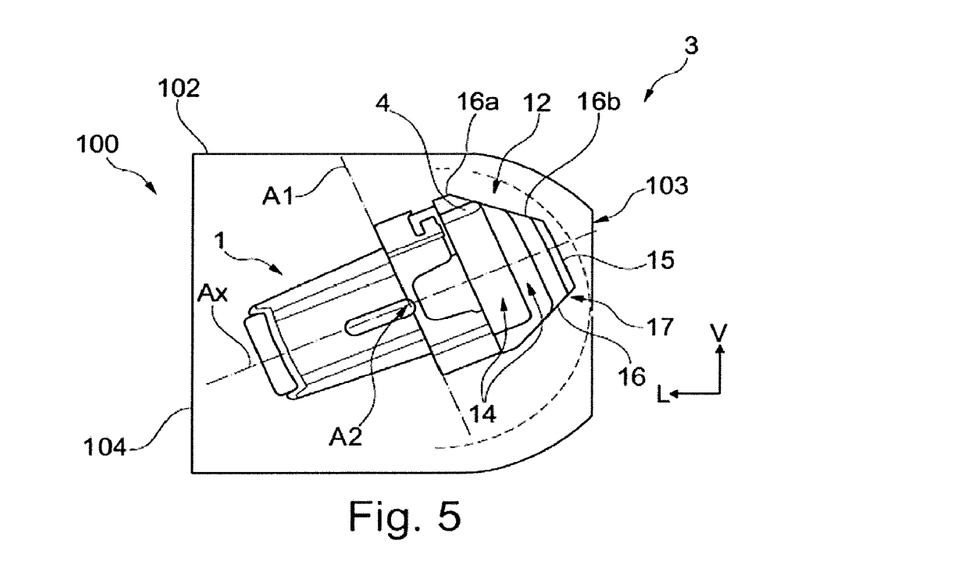
FIG. 5 is a side view similar to that from FIG. 4, in which the lighting module is in a third projection position, pivoted in the lamp about a second pivot axis.

Accordingly, as shown in FIGS. 4 and 5, when the lighting module 1 is mounted in a motor vehicle lamp so as to be able to pivot about a second pivot axis A2, said axis being normal to the optical axis Ax and to the first pivot axis A1 described above, the truncated parts forming bevels at the junction of the walls and the end edges then allow rotation of the lighting module without the dissipation member 12 striking the back wall 103 of the housing 102 of the lamp 100. The bevelling of the corners of the fins advantageously makes it possible to minimize the space necessary to allow the pivoting of the lighting module in the lamp about the second pivot axis A2. Because of this, the invention enables a significant reduction in the dimensions required for the lamp housing 102 since according to what is shown, this housing can have a plane back wall 103, forming a flat that reduces the general overall size of the housing whilst allowing the pivoting of the module that contains.

In exactly the same way as described above for pivoting about the first axis A1, it is clear that it would again have been necessary to increase the overall size of this lamp housings to allow pivoting of the lighting module about the second axis A2 if a fin had end edges 16 of standard shape, i.e. with a corner, at the junction of the summit and an end edge, that is not rounded.

As has just been described, it is particularly advantageous for the dissipation member to include a plurality of fins, arranged in series and configured so that on the one hand, the fins farthest from the centre have a length less than those of the fins arranged at the centre of this series, and on the other hand, one or more of these fins each have at least one bevel formed instead and in place of a right-angle corner at the corner between the summit and an end edge of that fin. The resulting reduction of the longitudinal dimension of the dissipation member, both at the level of its transverse extremities and its vertical extremities, allowing pivoting of the lighting module in a lamp housing of small overall size.

It is clear that, to allow the installation of pivotable lighting modules in a lamp housing of defined overall size, action could be taken on the inclination and the dimension of the bevel 17, just like on the reduction ratio of the length of the walls away from the centre relative to the length of the walls at the centre of the series of fins.

Referring to FIGS. 4 and 5, the end edges 16 of a fin 14 may be defined as comprising a straight part 16*a*, normal and adjacent to the base 4, and an inclined other part 16*b* forming a ramp up to the summit 15 of the fin 14. It is necessary to note that the bevel produced to form the inclined part 16*b* forming a ramp, may have a longitudinal dimension, i.e. a dimension projected onto the horizontal median lengthwise plane Ph, at least equal to the longitudinal dimension of the straight part 16*a*.

In this context of sizing the bevel 17, for at least one fin the height of the summit 15 could be between 10% and 80% inclusive, preferably between 30% and 60% inclusive, of the height of the fin at the level of its contact with the base 4, the height corresponding to the dimension along the vertical axis, parallel to the base.

Figure 6:
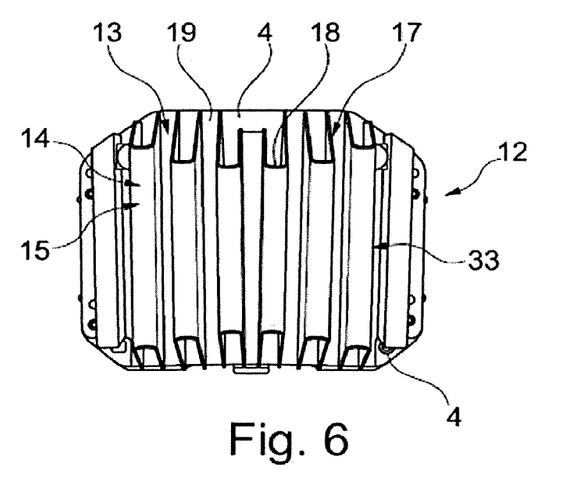
FIG. 6 is a rear view of the lighting module shown in FIG. 1.

Moreover, as can be seen in FIG. 6, the end edges of some of the fins may be cut differently from what has just been described, to form a clearance zone of the base, rendering accessible zones or parts of the second face 42 of the base. The end edge of these fins is then cut at a right-angle instead of being bevelled.

As explained above, without departing from the context of the invention, the fins 14 may be made in one piece with the base 4 and form with the latter a one-piece assembly, i.e. form a unitary part produced in a single manufacturing operation, or produced independently of the base and mounted thereon afterward, as shown.

The foregoing description explains clearly how the invention makes it possible to achieve the objectives set for it and notably to propose a lighting module able to pivot, within an acceptable overall size, inside a motor vehicle lamp. The description of one element naturally applies to any element of the same kind and the scope of the invention extends to any equivalent element.

The invention claimed is:

1. A motor vehicle lighting module for generating at least one light beam along an optical axis, the lighting module comprising:
    at least one light source and at least one heatsink configured to dissipate heat generated by the light source, the heatsink comprising:
        at least a base adapted to capture the heat generated by the light source and a dissipation member adapted to dissipate the heat captured by the base externally of the lighting module, the dissipation member comprising:
        a series of fins projecting from the base, each fin being defined by a summit parallel to the base that extends at a distance from the base and that defines the length of that fin, and by two end edges extending between the summit and the base, wherein
        the motor vehicle lighting module is configured to pivot about a first pivot axis and about a second pivot axis, and wherein
        the series of fins is configured to include eccentric fins the length of which is less than the length of the fins at the centre of the dissipation member, at least one fin further having at least one bevel at the junction between the summit and an end edge, wherein
        an end edge of a fin having a bevel includes a straight part, which is adjacent to the base and normal to the base, and an inclined part that extends along the motor vehicle lighting module and forms a ramp from the straight part to the summit, the inclined part having a longitudinal dimension at least equal to that of the straight part, wherein
        for at least one fin, the height of the summit corresponding to a direction parallel to the base, is between 30% and 60% of the height of the fin at the contact point of the fin with the base.

2. The motor vehicle lighting module according to claim 1, wherein the length of the fins decreases in a direction away from the centre of the series of fins.

3. The motor vehicle lighting module according to claim 2, wherein the length of fins decreases in a constant manner in the direction away from the centre of the series of fins.

4. The motor vehicle lighting module according to claim 1, wherein the length of fins varies so that their summits are inscribed in a cylindrical shape.

5. The motor vehicle lighting module according to claim 4, wherein the cylindrical shape in which the summits are inscribed has an axis coinciding with the first pivot axis.

6. The motor vehicle lighting module according to claim 1, wherein the summits extend parallel to the first pivot axis.

7. The motor vehicle lighting module according to claim 1, wherein the lighting module is configured to pivot about a second pivot axis perpendicular to the first pivot axis.

8. The motor vehicle lighting module according to claim 1, wherein a plurality of fins have a bevel at the junction between their summit and one of the end edges.

9. The motor vehicle lighting module according to claim 1, wherein at least one fin has a bevel at each junction between the lighting module's summit and the lighting module's end edges.

10. The motor vehicle lighting module according to claim 1, wherein the fins extend perpendicularly to a first plane in which the base mostly extends.

11. The motor vehicle lighting vehicle lamp including a housing inside which at least one motor vehicle lighting module according to claim 1 is mounted to be pivotable about two pivot axes.

12. The motor vehicle lighting module according to claim 2, wherein the length of fins varies so that their summits are inscribed in a cylindrical shape.

13. The motor vehicle lighting module according to claim 2, wherein the summits extend parallel to the first pivot axis.

14. The motor vehicle lighting module according to claim 2, wherein the motor vehicle lighting module is configured to pivot about a second pivot axis perpendicular to the first pivot axis.

15. The motor vehicle lighting module according to claim 2, wherein a plurality of fins have a bevel at the junction between their summit and one of the end edges.

16. The motor vehicle lighting module according to claim 2, wherein at least one fin has a bevel at each junction between the motor vehicle lighting module's summit and the motor vehicle lighting module's end edges.

17. The motor vehicle lighting module according to claim 2, wherein the fins extend perpendicularly to a first plane wherein the base mostly extends.

18. The motor vehicle lighting vehicle lamp including a housing inside which at least one motor vehicle lighting module according to claim 2 is mounted to be pivotable about two pivot axes.

* * * * *